(12) United States Patent
Einstein

(10) Patent No.: US 6,786,450 B1
(45) Date of Patent: Sep. 7, 2004

(54) RAPIDLY-CONVERTIBLE ROADABLE AIRCRAFT

(76) Inventor: Harry Einstein, 98 Parkwood Dr., Kingston, RI (US) 02881

( * ) Notice: Subject to any disclaimer, the term of this patent is extended or adjusted under 35 U.S.C. 154(b) by 0 days.

(21) Appl. No.: 10/082,994

(22) Filed: Feb. 26, 2002

Related U.S. Application Data

(60) Provisional application No. 60/274,148, filed on Mar. 9, 2001.

(51) Int. Cl.[7] .................................................. B64C 3/56
(52) U.S. Cl. ............................ 244/2; 244/49; 244/45 R
(58) Field of Search ....................... 244/2, 45 A, 45 R, 244/49, 50

(56) References Cited

U.S. PATENT DOCUMENTS

| | | | | |
|---|---|---|---|---|
| 3,960,103 A | * | 6/1976 | Rey ........................... 440/12.5 |
| 4,881,701 A | * | 11/1989 | Bullard ........................ 244/49 |
| 5,050,817 A | * | 9/1991 | Miller ........................... 244/2 |
| 5,201,478 A | * | 4/1993 | Wooley ......................... 244/2 |
| 5,984,228 A | * | 11/1999 | Pham ............................. 244/2 |
| 6,082,665 A | * | 7/2000 | Spitzer .......................... 244/2 |
| 6,224,012 B1 | * | 5/2001 | Wooley ......................... 244/2 |

* cited by examiner

Primary Examiner—Michael J. Carone
Assistant Examiner—Gabriel S Sukman

(57) ABSTRACT

A pusher canard aircraft convertible for road use. Canard outer sections are removable and are stored within the aircraft fuselage and the outer main wing sections rotate horizontally for storage on the fuselage top. The fuselage is designed as a lifting body which gives the aircraft three lifting surfaces. The lifting body takes advantage of ground effect, resulting in a lower landing speed. In road mode the vehicle as a 2 or 4 passenger model is smaller than a full size automobile. Hydraulic motor wheels propel the aircraft/vehicle for road use. An internal combustion engine within the fuselage drives the propeller for air operation. The propeller is disengaged, not removed, for land operation and the engine is used to drive an hydraulic pump to power the motor wheels for road use. A single nose wheel or two front wheels are used for both steering in landing/taxiing and for road use. In road mode, the appearance is as much like a van than as an aircraft. In flying mode, the appearance is not to unconventional.

5 Claims, 8 Drawing Sheets

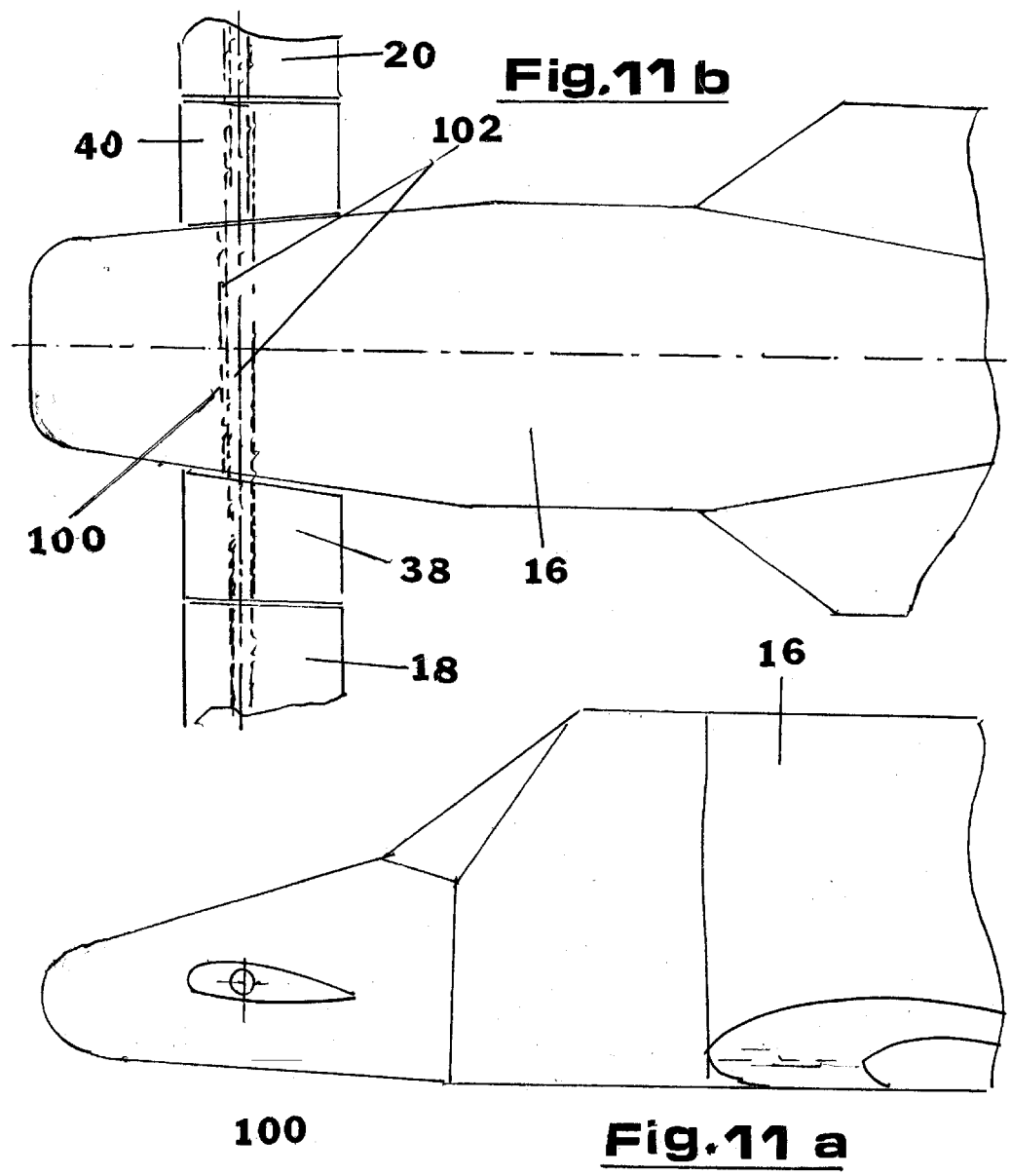

RAPIDLY-CONVERTIBLE ROADABLE AIRCRAFT

This application claims the benefit of provisional application No. 60/274,148 filed Mar. 9, 2002.

BACKGROUND OF THE INVENTION

1. Field of the Invention
2. Description of the Relevant Art

Since the Wright Brothers early flights, there has existed a strong desire and a belief that we would soon be driving vehicles that could also fly. That desire and belief exists today and attempts are still being made to arrive at a satisfactory and practical solution. There have been some successful flights of "flying cars" and even some that achieved certification, but none have proven practical.

The failures in achieving practical success were due, in part, to the designs which were attempts to add the flying components to existing or special cars. These designs required the flying components to be stored at an airport or trailered behind its car. The additional heavy weight of the flying car required large wing surfaces and high power. These components, wing, tail and propeller are relatively light and leaving them exposed, at an airport, to the wind and other outdoor elements leaves much to be desired. Flying to an airport other then the departing airport still leaves one without readily available ground transportation at most airports servicing light aircraft. None of these "flying cars" had the important advantages of the roadable aircraft of this invention where all flying components remain attached to or within the roadable aircraft for land operation. The art broadly teaches flying cars where wings and the like are foldable and remain with the vehicle. For many various reasons, previous designs proved impracticable.

There are at present, 13,192 small airports serving light aircraft in the U.S. These airports are underutilized for air travel at shorter distances (e.g. under 600 miles). This is often due to the lack of rental cars at these small airports. Roadable aircraft for travel could certainly help relieve congestion at commercial airports and total time, door to door, would usually be less with roadable aircraft then with commercial airlines, rail, bus or auto at the shorter distances.

A successful flying car or roadable aircraft must have its flying components secured to and travel with the ground vehicle in road travel. The disclosed roadable aircraft is a practical aircraft of slightly unconventional design. The design embodies no new untried technologies per se, but combines known technologies in a unique arrangement which permits the roadable aircraft to be no larger than a full size automobile and to be capable of road travel and parking in normal car parking spots and 1 car garages.

BRIEF SUMMARY OF THE INVENTION

The roadable aircraft embodying the invention is not more complex than the average light plane except for the addition of components (drive train), road controls and reinforcement of the structure for road travel. The additional cost is minor and some loss in performance is to be expected when compared to 'standard' aircraft of similar weight and power. The negative features are outweighed by the many benefits.

The designs indicate the possibility a 6 seat roadable aircraft with an additional increase in length of 3 feet which would still permit street and garage parking. Such aircraft could serve as an 'air taxi' with the benefits of door to door pickup and discharge.

The advantages of the invention include simplicity of construction, reduced drag due to 3 lifting surfaces rather than the conventional one. A non-roadable version of this aircraft would have a small hangar space requirement of approximately ¼ of that of a comparative size light aircraft, safer outdoor (airfield) storage, very minimal wing exposure provides high resistance to wind damage. A non-roadable aircraft version can be towed on its own wheels or trailered, which aircraft can be stored and serviced at one's home in a one car garage. The design indicates decreased drag due to the 'pusher' design. The wing storage systems add negligible weight and the small wing spans permits a lighter structure, the forces on the wings having a shorter moment, approximately half of that of a conventional comparative aircraft.

Broadly the invention comprises a pusher type aircraft having a fuselage, an engine mounted in the fuselage, an aft propeller driven by the engine, a plurality of wheels which support the fuselage and a land drive system which engages the engine and controls movement of the wheels. A segmented main wing section is secured to the upper portion of the fuselage. The main wing can function between a retracted position, where the wing sections are folded for road use, and an extended position for flight. A canard wing comprises fixed sections, secured to the fuselage, and removable sections secured to the fixed sections during flight and stored in the fuselage during road use. The canard wing serves as both elevator and aileron (Eleveron).

BRIEF DESCRIPTION OF THE DRAWINGS

FIGS. 11a and 11b show canard wing in flying mode; and

DESCRIPTION OF THE PREFERRED EMBODIMENT(S)

Figure 1:
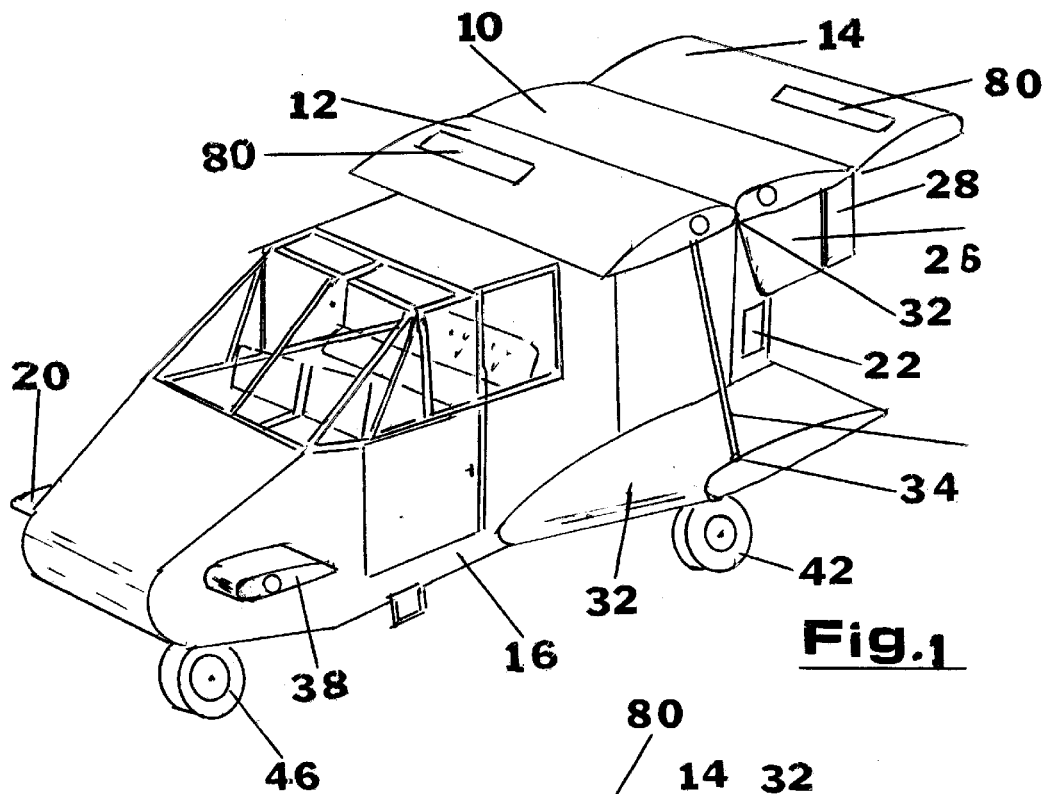
FIG. 1 is a perspective view of a roadable aircraft embodying the invention shown converted for road use.

Referring to FIG. 1, a roadable aircraft embodying the invention is shown generally converted for road use with a center main wing section 10, outer main wing sections 12 and 14 stored on the upper surface of a fuselage 16. Outer canard sections 18 and 20, not shown, are stored within the fuselage 16, entry being made through access panels 22. Wing struts 24 are used to assist in the main wing rotation and also in support during road use and in flight. A vertical stabilizer 26 with a rudder 28 is shown affixed to the underside main center wing 10. A second (twin) vertical stabilizer and rudder is not shown. Drag panels 80 shown would not be used if the vertical stabilizer 26 and the rudder 28 are used. Of importance is the location of the strut 24 pivot point 30 on a fuselage lifting surface 32 which strut 35 supports and guides the main wing outer sections 12 and 14 for stowing.

Figure 2:
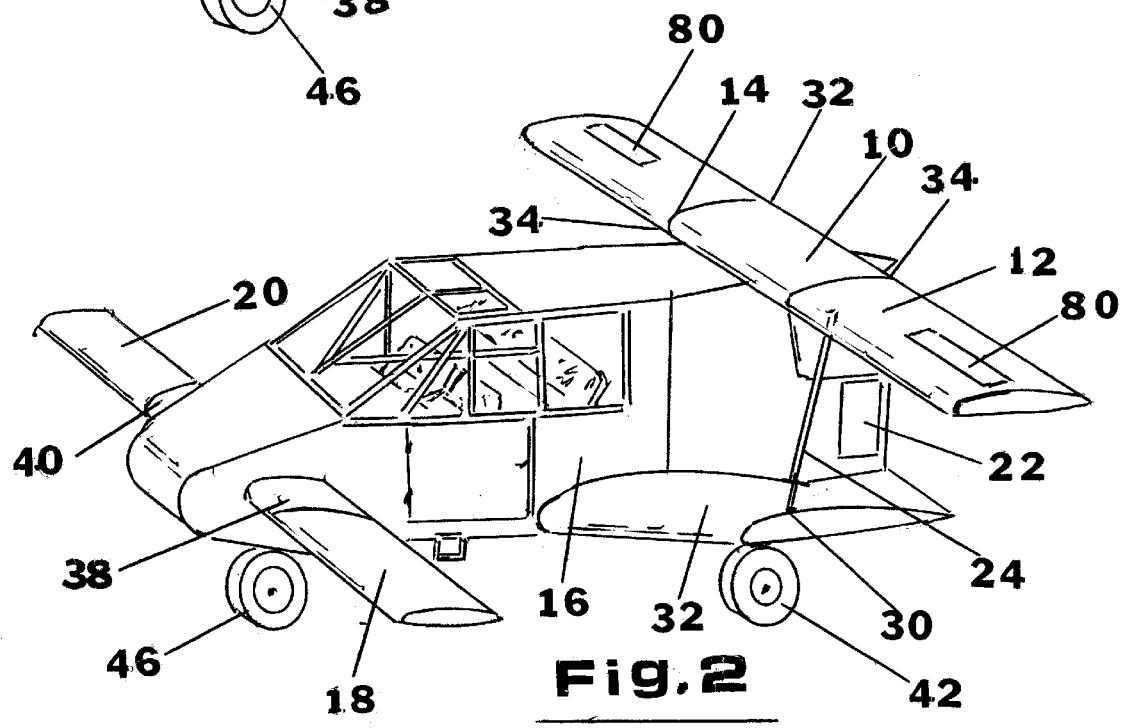
FIG. 2 is a perspective front view of the roadable aircraft ready for air operation.

Referring to FIG. 2, a roadable aircraft is shown ready for flight. The main wing outer sections 12 and 14 are secured to the main wing center section 10 by latches 34 and joining pistons 36, see FIGS. 5*a* and 5*b*. Drag panels 80, see FIGS. 9*a* and 9*b*, an alternate control for the vertical stabilizer 26 and the rudder 28 are formed in the outer ends of the wing sections 12 and 14. Outer canard wing sections 18 and 20 are shown affixed to the canard inner sections 38 and 40.

Figure 3:
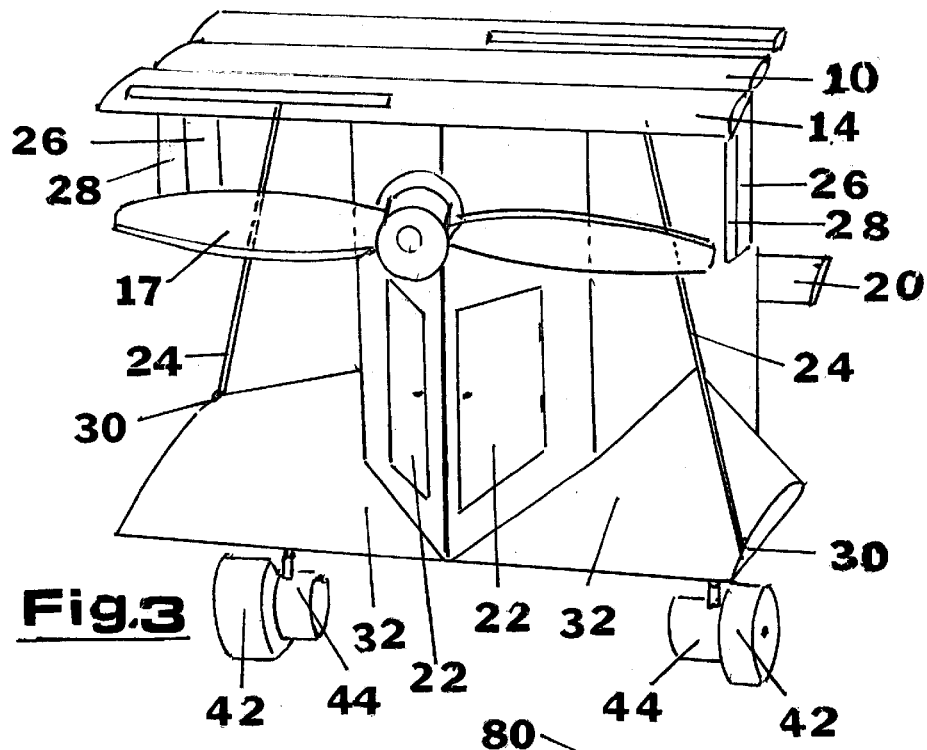
FIG. 3 is a perspective rear view of the roadable aircraft ready for road operation.

FIG. 3 is a rear perspective view. The two outer main wing sections 12 and 14 are shown on the top of the fuselage 16 fore and aft of the center main wing 10 which is affixed to the fuselage 16. The outer canard sections 18 and 20, not shown, would be stored within the fuselage 16, entry being made through access panels 22 shown closed. Main driving wheels 42 and hydraulic motors 44 are shown below the lifting fuselage 16. A propeller is shown at 17. The propeller 17, a 'pusher' propeller, provides a smoother air flow over the sides of the fuselage as compared to a flow by a front propeller.

Figure 4:
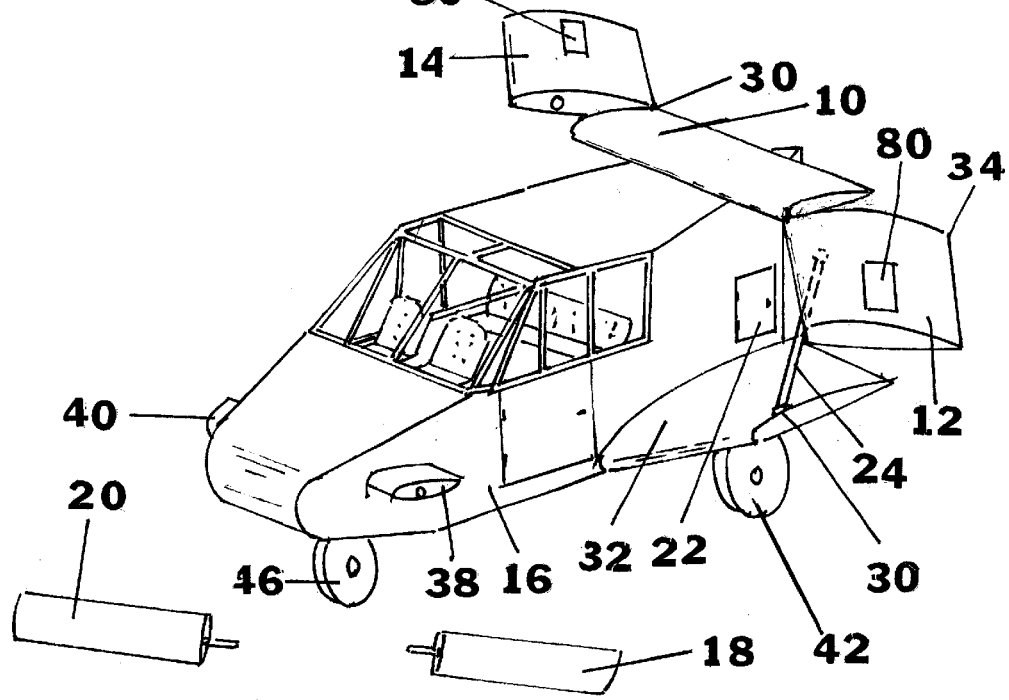
FIG. 4 is a perspective view of the roadable aircraft during conversion.

In FIG. 4 the main outer wing sections 12 and 14 are shown partially rotated or partially converted for road use. The two outer canard wing sections 18 and 20 are shown removed from the inner canard wing sections 38 and 40 prior to storage within the fuselage 16. Access is made through panels 22. The supporting strut(s) 24 are shown supporting the outer main wing sections for the rotating operation. The strut(s) are secured to the outer main wing sections but are designed to pivot at the juncture 30 of the outer fuselage lifting surface 32. A front steering wheel 46 is secured to the front of the fuselage 16. Dual front steering wheels (not shown) as in conventional autos are an alternative embodiment.

Figure 5:
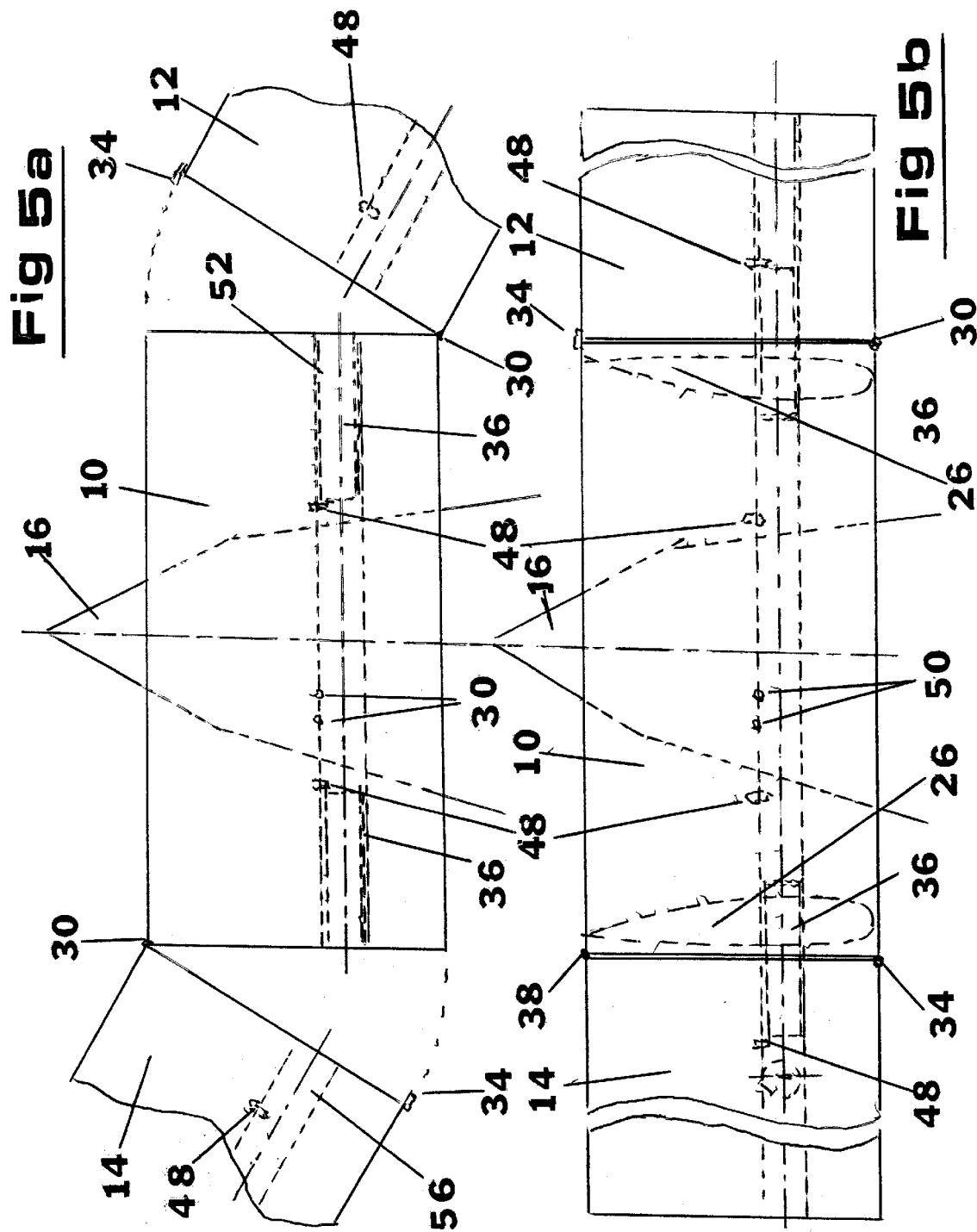
FIGS. 5a and 5b are top views of main wing sections during conversion and in air mode.

FIG. 5*a* is a top view of the wing sections 12 and 14 where the outer wing sections 12 and 14 are partially rotated for preparing for either road or flying operation. Pistons 36 are shown retracted to permit the outer wing rotation. Stops 48 are for piston extension or retraction. Pivot points 30 using studs or bolts provide support and guidance for wing rotations. Fluid inlet/outlets 50 are for air or hydraulic operation. A safety latch 34 holds the wing sections in position for entry of pistons 36 and for safety in flight.

When the roadable aircraft is in flight position, the cylinders 36 are in registration with one another and in sealing engagement as shown in FIG. 5*b*. Approximately half of the pistons 36 are engaged in outer spars 54 and 56, held in position by safety latches 34.

Figures 6, 7:
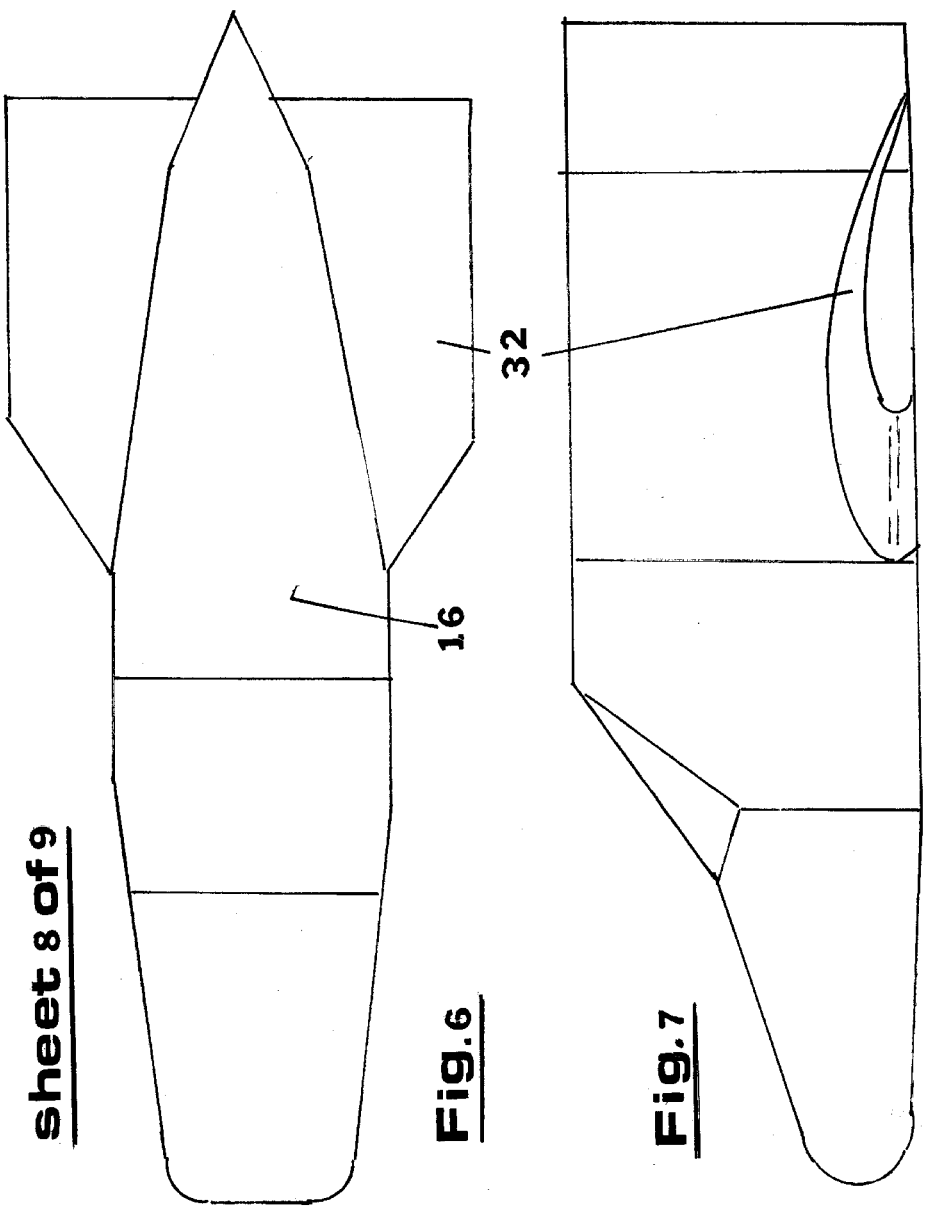
FIGS. 6 and 7 are top and side outlines views of a fuselage of the roadable aircraft.

FIGS. 6 and 7 are top and side outline views of the fuselage 16 of the roadable aircraft of this invention showing the contour of the fuselage/lifting body and the lifting surface 32.

Figure 8:
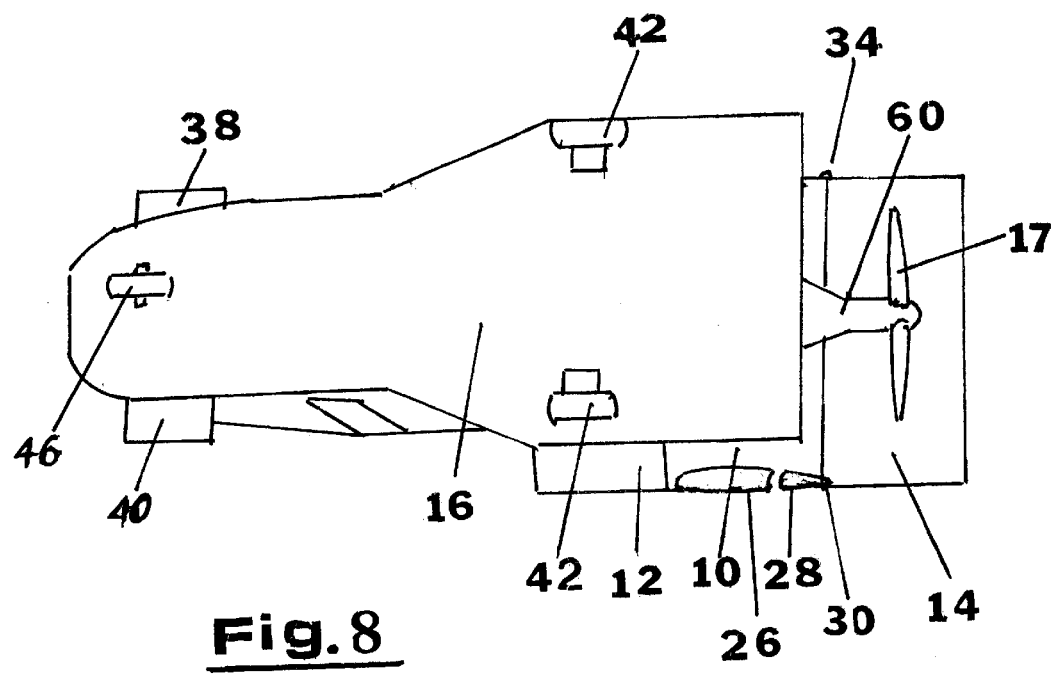
FIG. 8 is a bottom view of the roadable aircraft revealing the lifting surface of the fuselage functioning as a lifting body.

FIG. 8 is a bottom view illustrating the lifting surface of the fuselage functioning as a lifting body. The view also shows the roadable aircraft converted for land operation. The view shows a single front steerable wheel. The large vertical side panels of the roadable aircraft aids lateral stability.

Figure 9A:
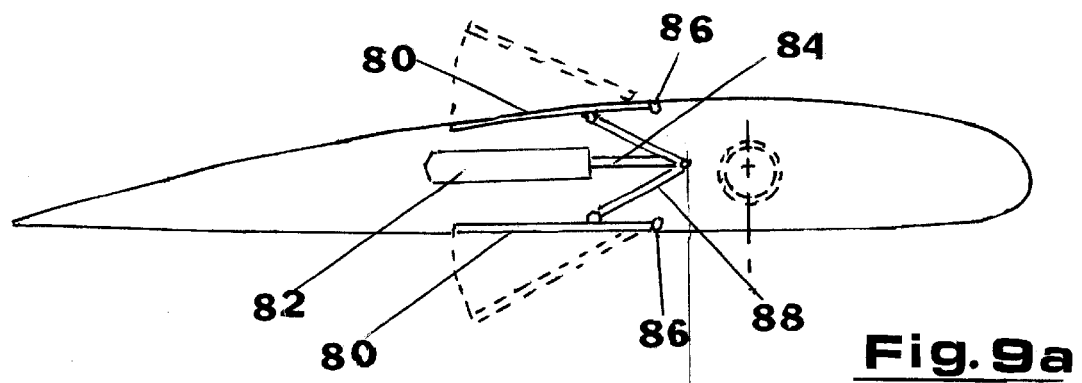
FIGS. 9a and 9b are side and top views of the end of an outer main wing section illustrating drag panels.
Figure 9B:
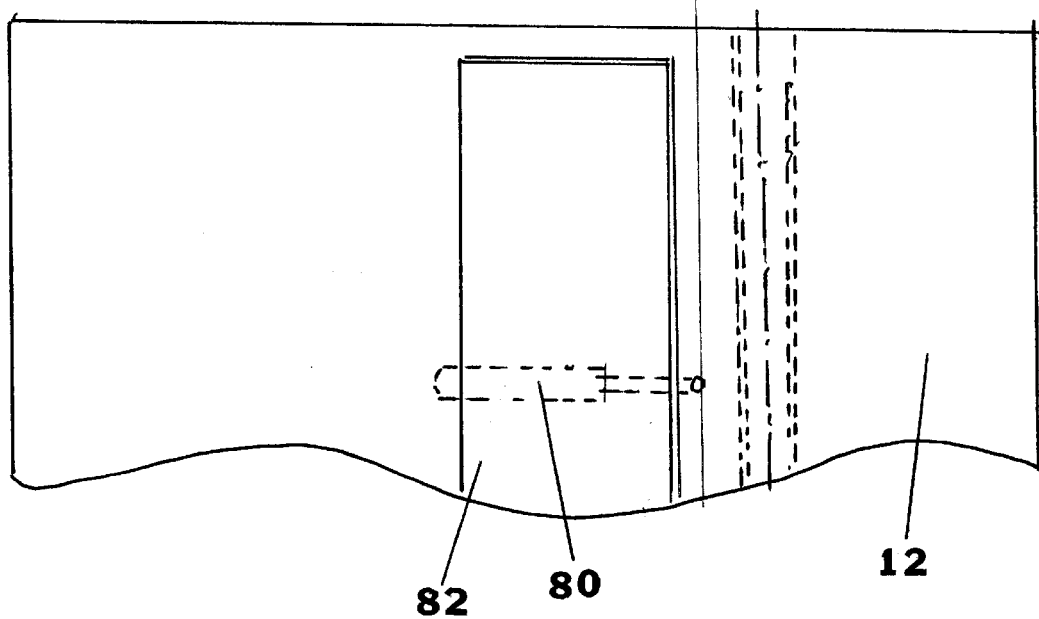

Referring to FIGS. 9*a* and 9*b*, rudder control is obtained by the 'drag' panels 80 on the outer edges of the outer wing sections 12 and 14. This control system is an alternative to the twin vertical stabilizer and rudder arrangement.

In that the drag panels for the outer wing sections 12 and 14 are identical, only the drag panels for the outer wing section 12 will be described in detail. Drag panels 80 are shown closed in solid lines and in their open position in dotted lines. An actuator, air, hydraulic or electric 82 controls the movement of the drag panels 80. The panels are hinged to the wing surface at 86. A drive arm 88 is pivotally secured to the actuator 82 and pivotally secured to the drag panel 80. Operation of the actuator 82 opens and closes the drag panels 80 to the degree required.

Figure 10:
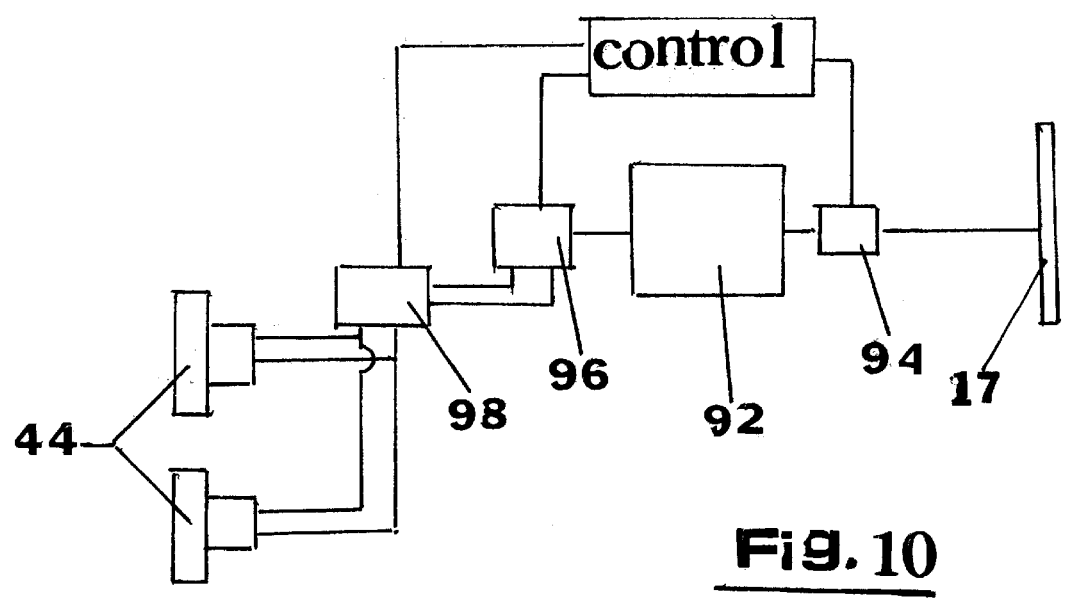
FIG. 10 illustrates an engine and hydraulic drive control system.

Referring to FIG. 10, a generic control system is shown. With knowledge of the invention as described, such a control system is well within the skill of the art. The CONTROL generically represents levers, dials, pedals, gauges and the like for controlling the hydraulic motors 44 for the drive wheels, an engine 92, a propeller disconnect 94, a hydraulic pump 96 and an off/on reverse hydraulic valve 98.

ALTERNATIVE EMBODIMENTS

Rudder control by means of drag panels 80. These would be operated by 'Wire'. In case of electrical failure a small manually operated vertical trim panel under the aircraft nose used primarily for 'rudder' trim could be manually operated for emergency use. Only a few degrees would be required for trim but 30° or more could be used as rudder control. (For emergencies) This system would simplify the structure and reduce parasitic drag. Alternately, such a trim panel could be under and at the rear of the fuselage. In addition to rudder control, the drag panels 80 (left and right) could be used together as 'spoilers' for steeper descent and shorter landing rolls. The drag panel control system is an alternative to the conventional stabilizer/rudder.

Counterweights for balance would be attached to the center section canard spars within the fuselage nose. The ample room inside the nose would allow the use of small weights on long arms to balance the canard. An elevator trim tab could be operated by a standard 'off the shelf' electrical trim mechanism. Such trim would be on the trailing section of one canard wing section. For increased roll control, the outer canard can easily be designed with dihedral with negligible weight change.

Engines: 3 types of engines 92 are possible. 1. Automotive engine with a approximately 2 to 1 reduction. A moveable idler gear, (possibly with plastic teeth, which would reduce gear noise and require little or no lubrication) would be used to drive the hydraulic pump as required. The idler gear only would require movement. 2. A wankle type engine could be used as with the automotive engine above. A dynacam engine (trade name). This engine would not require a speed reduction. Propeller drive would be through a connect/disconnect mechanism 94. A smaller (than above) plastic gear would be connected as required to the hydraulic pump. A second possibility is to have the pump driven by a fixed gear on the opposite end (From the propeller) of the engine shaft, which gear runs continually and a valve/s control the output. The small amount of energy loss and possibly small loss in valve life could be acceptable.

Estimated weight increase of aircraft due to roadable features:

| | |
|---|---|
| Hydraulic motors (2) | 40 lbs. (includes fittings) |
| Hydraulic pump | 20 lbs. |
| Valves | 15 lbs. |
| Hydraulic lines and misc. | 40 lbs. |
| Total | 115 lbs. |

Increased structural strength required for satisfactory road operation. Approximately 135 lbs. (Additional).

Wing Support Struts: The present design is for a single strut 24 whose primary use is to support the outer wing sections 12 and 14 during the 'folding' road use. Some wing support for flying also results. The use of a single strut 24 requires a 'solid' connection to the wing. The lower end of the strut 24 must pivot in the folding function. Use of 'V' struts or 'Y' struts lessens the need of a heavy connection to the outer wing sections 12 and 14.

Main Wing: The main wing consists of 3 equal 6 foot sections 10, 12 and 14. (For 2 and 4 seat models) The center section 10 is secured to the fuselage 16. All 3 sections have the main spars of aluminum tubing. Round tubing (a shown) is preferred, but square or rectangular is acceptable. The outer wing sections 12 and 14 (in flying mode) are fastened to the center wing section 10 by small shoulder screws or studs (pivot points) at the leading edge of one outer wing section 12 and the trailing edge of the other outer wing section 14. A short length of aluminum tubing (serving as a piston 36 with an elastomer seal) with its outside close to the inside of the wing spars is designed to be inserted halfway into the outer wing spar for flight. The connecting piston 36 is withdrawn into the center wing spar for road use. The "piston" movement can be accomplished by air pressure and vacuum or a manual ratcheting system (not shown). The outer wing sections are rotated horizontally, after the opening of latches 34 opposite the pivot points 30, thus permitting rotation around the fixed studs. The rotating joints carry little load in flight or in road use. Single wing struts 24 secured to the underside of each outer wing are joined to and permitted to rotate, on the extended flying surface of the fuselage directly (vertically) below the wing pivot points thus permitting the outer wing sections 12 and 14 to swing around and be stowed on the top of the fuselage 16, one in front and one behind the center wing section 10. The struts 24 primary purpose are to support and guide the outer wing sections to the wing stowing position for road use, but they also add some support to the wing in flight. This system with modification can be used in standard light aircraft to reduce wing span by ⅔ for aircraft storage, especially for outside storage, thus reducing possible wind damage.

Ailerons (Elevirons) can be incorporated on the main outer wing sections in place of the canard Ailerons action leaving the canard to serve only as lifting surface and an elevator.

In a further alternative embodiment, the main wing can consist of five sections where the two outermost sections hinged to wing sections 12 and 14 can be rotated vertically for 180°, to lay on top of the next succeeding inner sections and then subsequently the 'double' wing sections can then be rotated horizontally, as described for the preferred embodiment, and these additional wing sections can be connected by movable pistons as disclosed in the preferred embodiment.

Canard Wing: Referring to FIGS. 11 and and 11b, the canard wing consists of small, left and right sections 38 and 40 which are permanently installed. They can be configured to move independently to serve as ailerons, or together as an elevator. Outer canard wing sections 18 and 20, which are removable, are attached to the inner short canard sections 38 and 40 for flight. The outer canard wing sections are stored within the fuselage through panel openings at the rear of the fuselage for storage or road use. The canard sections 38 and 40 use an aluminum spar 102 of each left and right section joined to a supporting member 100 by means of a heavy duty piano hinge 101 (or a series of hinges) which hinge is cut in half through at the center, thus permitting the independent movement of left and right canard sections. The larger outer canard sections 18 and 20 have main spars of aluminum tubing in which the OD is a close fit to the ID of the inner tubing of the attached canard sections. The large surface of the 'flying' canard should require little movement for control thus permitting good leverage for manual operation. Counter balance would be accomplished by small weights on long arms fixed to the center section spars within the fuselage front. Dihedral if needed is easily accomplished by a bend in the spar support 100.

In the land mode, the aircraft/vehicle is smaller in size than some full size autos. (6 feet wide, 6 feet high and 17 feet in length for the 2 seat version). A 4 seat model would require an additional foot in length. The appearance on the road is as much like a van as an aircraft. Although not considered a family car, the aircraft could certainly be used for shorter trips and parked in any auto parking spot.

All the flying components are attached or stowed within the fuselage 16 in land mode. No components are trailered or left behind when traveling on land. As an aircraft (in flying mode) it is not to unconventional in appearance.

The propeller 17 is not removed for land use and is well protected from road hazards. The land drive system is all hydraulic with hydraulic motor wheels serving as the main landing wheels. The hydraulic pump, motor wheels, controls and supporting structures are estimated to weight 225 lbs.

It is believed pitch and roll will be easily controlled by the large (flying) canard wing. The twin vertical stabilizers and rudders 26 and 28 along with the fuselage shape (large flat vertical sides) would control yaw. The alternate system of drag panels, FIG. 9b for rudder control would rely on the flat fuselage sides for control.

The following specifications and performance numbers are estimates based on comparisons to various aircraft in the same weight and power class with changes, additions, etc. based on the differences between the aircrafts.

Estimated Specifications and Performance

|  | 2 Seat | 4 Seat |
| --- | --- | --- |
| Total Wing Area | 114 sq. ft. | 114 sq. ft. |
| Empty Weight (including ground drive train) | 1225 lbs. | 1350 lbs. |
| Passengers | 340 lbs. | 680 lbs. |
| Fuel (60 gals) | 360 lbs. | 360 lbs. |
| Baggage | 50 lbs. | 75 lbs. |
| Total Weight | 1950 lbs. | 2460 lbs. |
| Wing Loading, lbs./sq. ft. | 17.11 | 21.58 |
| Power Loading, lbs./hp. | 11.14 | 10.93 |
| Cruise Speed 75% Power | 140 mph. | 145 mph. |
| Stall Speed | 45 mph. | 52 mph. |
| Cabin Width | 42 in. | 44 in. |
| Overall Length | 17 ft. | 18 ft. |
| Horsepower | 175 | 225 |

Note: A 6 seat model is possible. The overall length in land mode would be 21 feet and the cabin width at 46 in. Total wing area can be increased up to 175 sq. ft. A 300 hp. engine would probably be required. Parking in spaces laid out for full size cars is possible. (Length would be 3 ft. longer than full size cars). A 6 seat roadable aircraft if ever developed as a commercial aircraft could find some acceptance as a small carrier. The door to door service has advantages for flights of about 600 miles or less. The advantage is even greater in the more remote areas which lack rail and airports to serve commercial aircraft.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. A canard roadable aircraft which comprises:

a fuselage having a bottom providing a first lift surface;

removable canard wings secured to the fuselage providing a second lift surface;

a convertible main wing secured to the fuselage providing a third lift surface;

at least three wheels to support the fuselage, at least one of said wheels being a drive wheel;

a propeller connected to an engine within the fuselage;

means for rotating the propeller;

means for disconnecting said propeller from said engine;

means for rotating the drive wheels;

wherein said main wing comprises three sections, a first main section and two outer sections, the aircraft further including:

means for pivoting one outer section at its leading edge for stowing in front of the main section;

means for pivoting a second outer section at its trailing edge for stowing behind the fixed main wing section; and struts pivotally secured at one end to the fuselage lifting surface and at the other end to the underside of the outer sections to support the outer wing sections in the converting step.

2. The aircraft of claim 1 where the main wing sections contain supporting:

tubular spars which are joined in the flying mode along a longitudinal axis by internal tubular pistons wherein the spars function as mating cylinders;

means for moving the pistons into and out of the spars, whereby when the piston is not received within the spar of the main wing section the outer sections may be converted to the non-flying mode.

3. The aircraft of claim 1 wherein the canard wing comprises:

four sections, two fixed sections secured on either side of the fuselage and two outer sections being removable from the inner sections and storable within the aircraft's fuselage.

4. The aircraft of claim 1 which comprises:

drag panels on the main outer wing sections; and means to control movement of the drag panels for rudder control, rudder trim and spoiler action.

5. The aircraft of claim 1 which comprises:

twin rudders on vertical stabilizers affixed to the underside of the main center wing section at its outer edges.

* * * * *